United States Patent Office 2,777,795
Patented Jan. 15, 1957

1

2,777,795
SAND-GRAIN CORE INSECTICIDAL COMPOSITION

John F. Les Veaux, Middleport, and Edward F. Orwoll, Medina, N. Y., assignors to Food Machinery and Chemical Corporation No Drawing. Application October 16, 1952, Serial No. 315,188

6 Claims. (Cl. 167—42)

The present invention relates to a pelletized formulation carrying an insecticide and which formulation is adapted for large scale application over areas normally covered with water.

In the large scale application of insecticides by spraying or dusting the insecticide, for instance from an airplane or other airborne vehicle, considerable loss in application of the insecticide is experienced by reason of carriage from the locus of application due to wind and failure of the insecticide properly to act in the area of application if the same be covered by water, due to the necessity of applying the insecticide in a finely divided solid condition and of a particle size so small that the particles will normally float upon the surface of the water and not be wetted by the water.

It is an object of the present invention to provide an insecticide formulation which will normally penetrate the surface of the water.

It is also an object of the invention to provide an insecticide formulation not readily retained upon intervening foliage during large scale aerial application.

It is a further object of the invention to provide a water-insoluble core, on the exterior of which may be carried a water dispersible formulation containing an insecticide as the active ingredient.

In accordance with the present invention, an impalpable powder carrying the desired insecticide is prepared and distributed upon the surface of a water-insoluble core. In general, argillaceous materials, such as clay of the montmorillonite, kaolinite or other types of clay, is ground with the insecticide in any desired ratio. In general, this ground material will be an impalpable powder, the fineness of which is such as to designate it as a flour; that is, on the order of 325 mesh or finer.

This mixture is then distributed upon the surface of a material as a core having a specific gravity greater than 1. The core material may be insoluble in water. Wind-classified beach sand, by reason of its cheapness and proper size, constitutes an excellent vehicle for the core material. The silica beach sand, argillaceous carrying material and the insecticide may be blended together in an ordinary muller and the blending action is such as to produce a free-flowing product in which the individual grains of beach sand are not comminuted but are coated with a fine dust or film of dust which may be handled easily and satisfactorily in conventional dusting devices employed in aerial dusting of areas. These coated grains, when falling in water-inundated areas, such as swamps, rice fields, and the like, readily penetrate the surface of the water and are carried to the bottom areas thereof where the argillaceous coating then is wetted; the insecticide carried in the clay and upon the core of the sand permeates the total area and effectively acts upon the larvae of insects, such as mosquitoes, which normally breed in such water-inundated areas. The efficiency of usage of insecticide applied in this manner is high, and, therefore, the application rate is low, since loss by wind dispersion is at a minimum, as is loss by attachment to foliage since the pellets do not adhere to foliage but will fall therethrough into the water-inundated areas to be treated.

2

The pelletized material can be made with any desired or selected insecticide, such as BHC or benzenehexachloride, DDT, or dichlorodiphenyltrichloroethane, and insecticides of similar structure, chlordane, or octachloromethanotetrahydroindane, and other indane derivatives or naphthalene derivatives, such as aldrin and dieldrin; that is, 1,2,3,4,10,10-hexachloro-1,4,4*a*,5,8,8*a*-hexachloro-1,4,4*a*,5,8,8*a*-hexahydro-1,4,5,8,-dimethanonaphthalene and 1,2,3,4,10,10-hexachloro-6,7-epoxy-1,4,4*a*,5,6,7,8,8*a*-octahydro-1,4,5,8-dimethanonaphthalene, respectively, toxaphene or chlorinated camphene and materials of similar physiologic action. The insecticide is incorporated in the total formulation in any desired concentration. It will generally be found that from about 0.5% to about 3% or more of the insecticide will produce a concentration sufficient to effect a substantially 100% kill of mosquito larvae (*Anopheles quadrimaculatus*) as well as Aedes and Culex, and other species of mosquito.

For the ordinary wind-classified beach sand, the proportion by weight of sand would ordinarily be in the neighborhood of from about 80 to about 95% by weight of the final product, and the coating about 20 to 5%. The composition of the coating of the core of sand pellets will be from about 20% to about 75% insecticide with the remainder argillaceous material, depending upon the type of argillaceous material and the type of insecticide employed. Thus, very satisfactory kills of larvae of anopheles aedes and culex have been effected where the coating composition comprised 42% of BHC (containing 36% of the gamma isomer) and 58% clay. Satisfactory kills were also obtained where the coating for the core of sand comprised 70% bentonite clay and 30% of BHC containing 36% of the gamma isomer.

A very satisfactory final product containing exceptional wetting and dispersing characteristics is possible of production by including bentonite in any dusting clay in which the insecticide is to be dispersed. The characteristic swelling and gellification of the bentonite insures disengagement of the film of dust and dispersion of such dust and the insecticide carried thereby throughout the body of the water-inundated area to be treated. Under such conditions, the coating composition of the sand core is about 42 parts BHC (36% gamma content) 19 parts fuller's earth and 38 parts bentonite. Another typical formulation to be added to the muller would be 0.53 lb. BHC (36% gamma), 1.6 lbs. bentonite, 10.0 lbs. sand 20–60 mesh. These ingredients are introduced into an edge roller pigment mixer, such as a Simpson muller and the whole ground until the clay and insecticide are an impalpable powder, when it will be found that there is produced a free flowing pelletized end product which is essentially a grain of sand as a core possessing a fine coating of the mixed clay and insecticide upon the exterior. It will be found advantageous in most instances to conduct the grinding and blending in a dry state. If it be found necessary to add the insecticide in the form of solution, a minimum amount of solvent should be employed to reduce subsequent drying operations to a minimum as the coating tends to be retained upon the sand particles and the finished product may be bagged, stored or shipped immediately to the location of use, without fear of separation or segregation of sand and clay.

What is claimed is:

1. An insecticidal composition in the form of a pellet comprising a core of a grain of silica of 20 to 60 mesh and a coating upon said silica grain of a finely ground argillaceous mineral powder not larger than about 325 mesh carrying an organic insecticide.

2. An insecticidal composition in the form of a pellet comprising a core of a grain of silica of 20 to 60 mesh and a coating upon said silica grain comprising a finely ground argillaceous mineral powder not larger than about 325 mesh and an organic insecticide.

3. The composition of claim 1 wherein the argillaceous mineral powder is bentonite clay.

4. Composition according to claim 1 wherein the insecticide is benzene hexachloride.

5. Composition according to claim 1 wherein the insecticide is DDT.

6. Composition according to claim 1 wherein the insecticide is chlordane.

References Cited in the file of this patent

UNITED STATES PATENTS

| | | |
|---|---|---|
| 1,450,128 | Baker | Mar. 27, 1923 |
| 2,330,227 | Lynn | Sept. 28, 1943 |
| 2,444,752 | Siegler | July 6, 1948 |
| 2,506,635 | Flenner | May 9, 1950 |

OTHER REFERENCES

Frear: Chemistry of Insecticides, Fungicides and Herbicides, 2nd ed., D. Van Nostrand Co., Inc., pages 289–290, 1948. (Copy in Div. 43.)

Woodruff et al.: Jour. Econ. Ent., vol. 42, pages 249 to 253. April 1949. (Copy in Div. 43.)